United States Patent [19]

Kato et al.

[11] 4,303,979

[45] Dec. 1, 1981

[54] FREQUENCY SPECTRUM VARIATION MONITORING SYSTEM

[75] Inventors: Kanji Kato; Satoshi Tanisaka, both of Hitachi, Japan

[73] Assignee: Hitachi, Ltd., Tokyo, Japan

[21] Appl. No.: 897,141

[22] Filed: Apr. 17, 1978

[30] Foreign Application Priority Data

Apr. 18, 1977 [JP] Japan .................. 52-43565

[51] Int. Cl.$^3$ ............................................ G06F 15/31
[52] U.S. Cl. .................................. 364/485; 324/77 B; 324/78 D
[58] Field of Search .............. 364/484, 485; 324/77 B, 324/77 E, 78 D, 78 F, 78 Z

[56] References Cited

U.S. PATENT DOCUMENTS

| | | | |
|---|---|---|---|
| 3,529,140 | 9/1970 | Doering | 364/485 |
| 3,725,690 | 4/1973 | Hjorth | 364/485 |
| 4,084,245 | 4/1978 | Bunge | 364/485 |

*Primary Examiner*—Jerry Smith
*Attorney, Agent, or Firm*—Craig and Antonelli

[57] ABSTRACT

In a frequency spectrum variation monitoring system, the values of two parameters including the root mean square (RMS) value of each of the output signals from various detectors disposed at several locations in a nuclear power plant and the RMS value of the time-differentiated version of the detector output signal are calculated both at the normal state and at any time instant. These parameter values are used to obtain the RMS value of the deviation of the frequency spectrum of the detector output signal from the normal state and the average frequency weighted with that frequency spectrum deviation, so that the geometrical variation in frequency spectrum of the detector output signal may be monitored.

7 Claims, 6 Drawing Figures

FREQUENCY SPECTRUM VARIATION MONITORING SYSTEM

BACKGROUND OF THE INVENTION

1. Field of the Invention

This invention relates to a system for detecting on a real time basis the variations in frequency spectrum of the output signals from various detectors disposed at several locations in a nuclear power plant, especially the frequency values, the locations at which anomalous peaks occur on the power spectral densities (hereinafter referred to as PSDs) of the detector output signals.

2. Description of the Prior Art

Frequency spectrum analyzers have hitherto been used to monitor the variations in frequency spectrum of signals. The frequency spectrum analyzer, however, is expensive and rather voluminous. In addition, the analyzer takes relatively much time for data processing and it is difficult for the analyzer to monitor many signals on a real time basis. The Japanese Patent Application Laid-Open No. 87941/76 discloses a system in which the variation in frequency spectrum of a signal is detected by monitoring continuously the average frequency and the RMS value given by the following equation (1):

$$\nu(t) = \frac{1}{2\pi} \sqrt{\frac{\int_0^\infty \omega^2 S(\omega, t) d\omega}{\int_0^\infty S(\omega, t) d\omega}} = \frac{1}{2\pi} \frac{\mu(t)}{\sigma(t)} \quad (1)$$

Here, $\nu(t)$ is the average frequency at time instant t, $\omega$ the angular frequency, $S(\omega, t)$ the short-time PSD, $\sigma(t)$ the RMS value of the signal at time instant t, and $\mu(t)$ the RMS value of the time-derivative of the signal. When the signal has a relatively broad frequency range, the average frequency given by the equation (1) will have a small variation even though an anomalous peak occurs on the frequency spectrum. Accordingly, it is difficult in the above-described prior art system to detect the geometrical variation in the frequency spectrum and to estimate the frequency value at which the anomalous peak occured.

SUMMARY OF THE INVENTION

One object of this invention is to provide a system which can detect the geometrical variation in frequency spectrum of a signal, especially the frequency value at which an anomalous peak occurs, even when the signal has a broad frequency range.

Another object of this invention is to provide a system which can detect and monitor the geometrical variation in frequency spectrum of a signal on a real time basis.

According to this invention, when the PSD of the noise component of a signal is changed from $S_N(f)$ at the normal or standard state to $S_A(f)$, the RMS value and the average frequency with respect to the difference $S_P(f)$ between $S_A(f)$ and $S_N(f)$ are monitored. The RMS value $\sigma_P$ and the average frequency $\nu_P$ of the difference $S_P(f)$ are represented as follows:

$$\sigma_P = |\sigma_A^2 - \sigma_N^2|^{\frac{1}{2}} \quad (2)$$

$$\nu_P = \left| \frac{\int_0^\infty \{f^2 S_A(f) - f^2 S_N(f)\} df}{\int_0^\infty \{S_A(f) - S_N(f)\} df} \right|^{\frac{1}{2}}$$

$$= \left| \frac{(\mu_A)^2 - (\mu_N)^2}{\sigma_A^2 - \sigma_N^2} \right|^{\frac{1}{2}} = \left| \frac{\nu_A^2 \sigma_A^2 - \nu_N^2 \sigma_N^2}{\sigma_A^2 - \sigma_N^2} \right|^{\frac{1}{2}} \quad (3)$$

Here, f represents the frequency, $\sigma_N$ and $\sigma_A$ the RMS values of the signal when the PSD of the signal is $S_N(f)$ and $S_A(f)$ respectively, $\mu_N$ and $\mu_A$ the RMS values of the time-derivatives of the signal when the PSD of the signal is $S_N(f)$ and $S_A(f)$ respectively, $\nu_N$ and $\nu_A$ the average frequencies corresponding to the signal when the PSD of the signal is $S_N(f)$ and $S_A(f)$ respectively.

DESCRIPTION OF THE PREFERRED EMBODIMENTS

Figure 1:
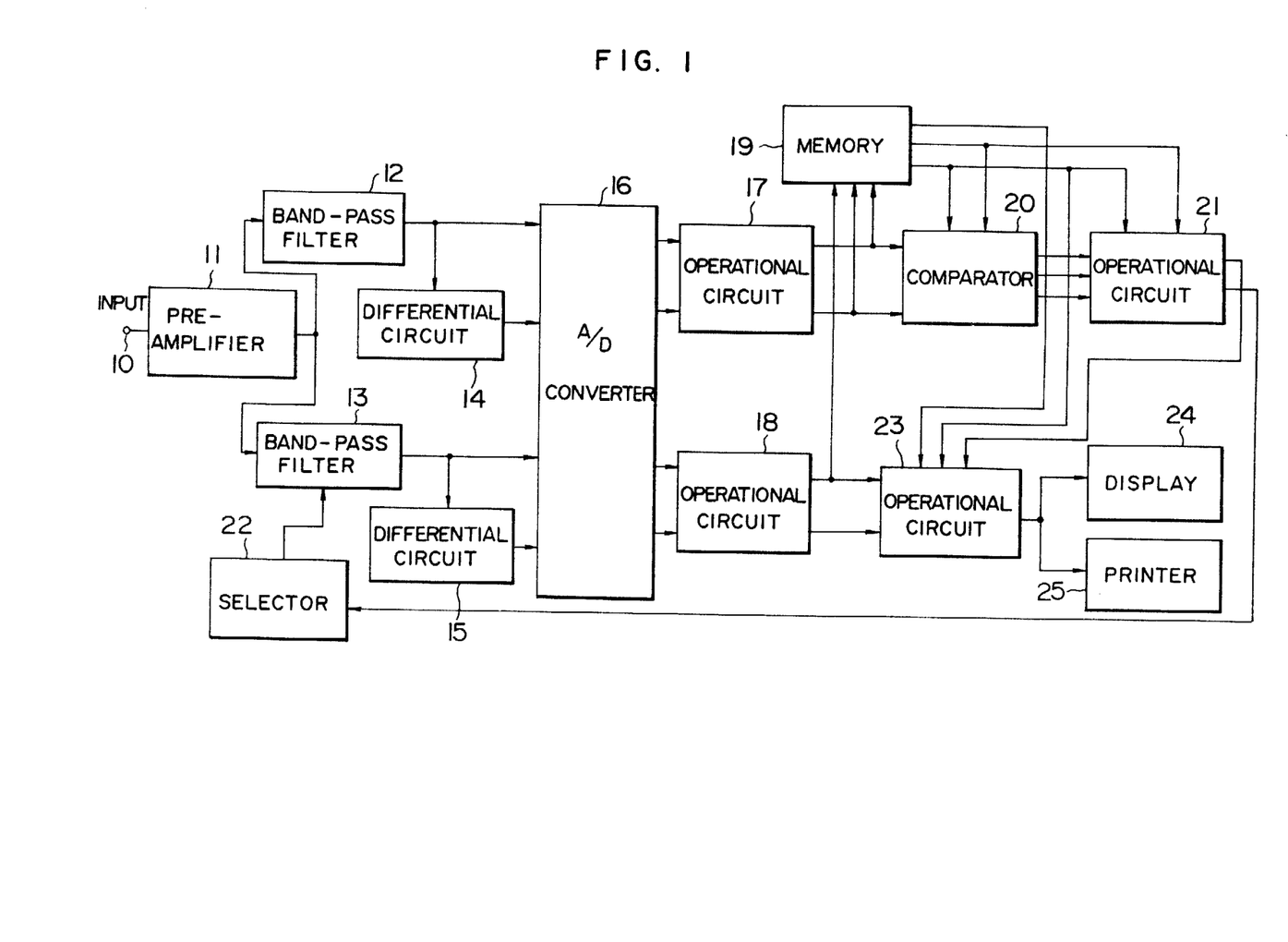
FIG. 1 shows in block diagram a frequency spectrum variation monitoring system as one embodiment of this invention.

FIG. 1 schematically shows a frequency spectrum variation monitoring system as one embodiment of this invention. Before the start of the monitoring operation and input signal at the normal state is supplied through a pre-amplifier 11 from a terminal 10 to a band-pass filter 12 having a frequency range of $f_o - f_k(Hz)$. The output of the band-pass filter 12 is supplied directly to an A/D (analog-to-digital) converter 16 and through a time-differential circuit 14 to the A/D converter 16. In the A/D converter 16, the signals supplied directly and through the circuit 14 are converted into digital signals respectively. These digital signals are digitally processed by an operational circuit 17 to obtain the RMS value $\sigma$ and average frequency $\nu$ of the input signal at the normal state. In the operational circuit 17, the RMS value and the average frequency are calculated according to the following equations (4) and (5):

$$\sigma = \left| \frac{1}{T} \int_0^T \{X(t)\}^2 dt \right|^{\frac{1}{2}} \quad (4)$$

$$\nu = \frac{\mu}{\sigma} \quad (5)$$

Here, X(t) is the fluctuating component of the input signal, T the time over which the integration was taken, and $\mu$ the RMS value of the time-derivative of X(t) represented by the following equation (6):

$$\mu = \left| \frac{1}{T} \int_0^T \left( \frac{d}{dt} x(t) \right)^2 dt \right|^{\frac{1}{2}} \quad (6)$$

Figure 2:
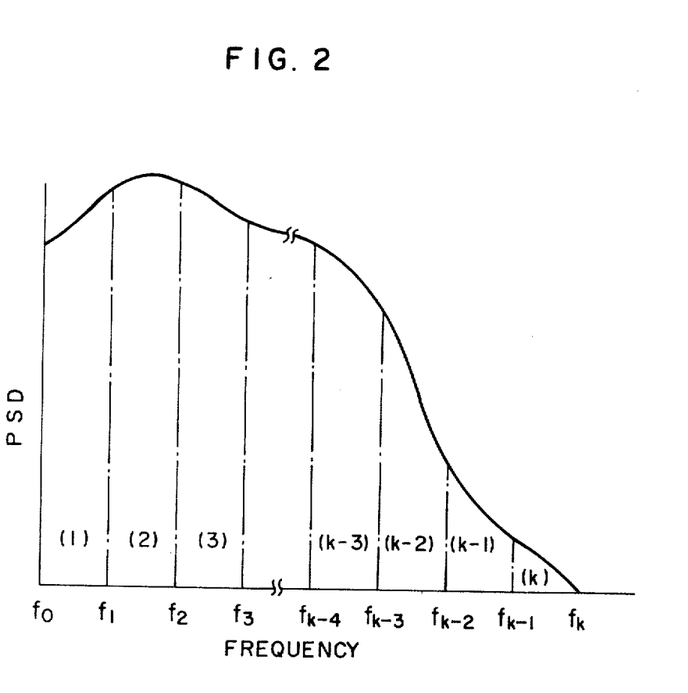
FIG. 2 graphically illustrates the operation of the selector shown in FIG. 1.
Figure 5:
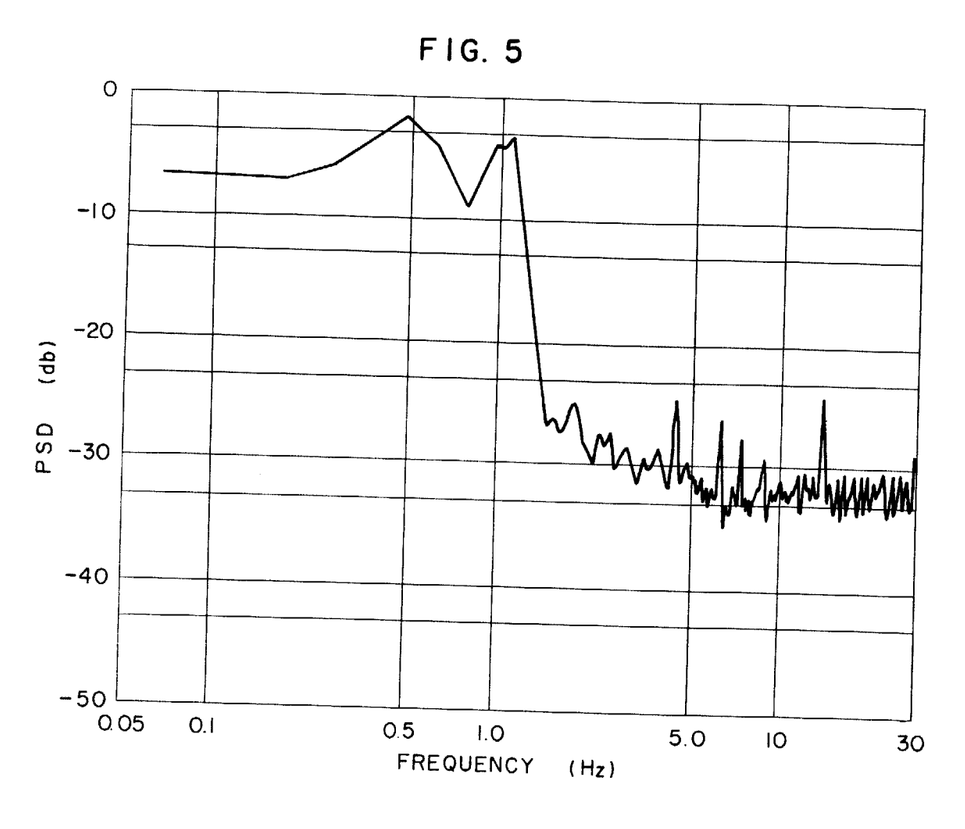

The RMS value $\sigma$ and the average frequency $\nu$ at the normal state are stored in a memory 19. At the same time, the k RMS values $\sigma_m°$ (m = 1, 2, ..., i, ..., k) at the normal state for k frequency subranges (1) to (k) divided from the frequency range $f_o - f_k$ (see FIG. 2) are stored in the memory 19. The RMS values $\sigma_m°$ for the respective frequency subranges (1) to (k) at the normal state are obtained by converting the output of a programmable band-pass filter 13 (e.g. Computer-Comparable Programmable Multichannel Analog Filter avalabe from Rockland Co. as System 816) connected to the preamplifier 11 and the output of a time-differential circuit 15 into digital signals respectively through the A/D converter 16 and thereafter processing digitally these digital signals in an operational circuit 18 in accordance with the above-described equation (4). In the programmable band-pass filter 13, the number k of division of the frequency range and the boundary frequencies $f_1$ to $f_k$ are preset. After the results of the above-described arithmetic operations at the normal state have been stored in the memory 19, the continuous monitoring of the frequency spectrum of the input signal is started. The input signal is normally supplied only to the band-pass filter 12 and the RMS value and average frequency for the broad frequency range $f_o - f_k$ are obtained by the operational circuit 17. The obtained arithmetic results are supplied to a comparator 20. The comparator 20 serves to compare the instantaneous or current RMS value and average frequency at any time instant under consideration with the normal-state RMS value and average frequency at the normal state stored in the memory 19 and to check whether the difference between the RMS values and the difference between the frequencies are respectively within predetermined tolerances or not. If an anomaly occurs on the PSD of the input signal and the above differences exceed the predetermined tolerances, an opertional circuit 21 is triggered. The operational circuit 21 digitally calculates the RMS value and average frequency with respect to only the anomalous peak on PSD as shown in FIG. 5 in accordance with the above-described equations (2) and (3) on the basis of the RMS value and average frequency at the time instant under consideration and the RMS value and average frequency at the normal state stored in the memory 19. The thus calculated average frequency is sent to a selector 22. The average frequency is compared with the boundary frequencies $f_1$ to $f_k$ for the frequency subranges (1) to (k) preset in the programmable band-pass filter 13 so that one of the frequency subranges shown in FIG. 6 in which the average frequency $\nu_p$ for the anomalous component of the input signal lies may be determined to select the corresponding boundary frequencies $f_i$ and $f_{i+1}$ ($f_i \leq \nu_p \leq f_{i+1}$) in the programmable band-pass filter 13. Next, the input signal is supplied to the band-pass filter 13 whose pass-band was established between the boundary frequencies $f_i$ and $f_{i+1}$, and the RMS value $\sigma_i$ and average frequency $\nu_i$ at the time instant for consideration for the i-th frequency subrange are calculated by an operational circuit 18. The RMS value $\sigma_i$, the average frequency $\nu_i$, the RMS value $\sigma_i°$ for the i-th frequency subrange at the normal state stored in the memory 19 and the RMS value $\sigma_p$ associated with the anomaluous peak calculated by the operational circuit 21, are all supplied to an operational circuit 23. The operational circuit 23 calculates a parameter $\alpha$ characteristic of the peaking degree and a parameter $\beta$ characteristic of the frequency shift in accordance with the following equations (7) and (8):

$$\alpha = \left| \frac{\sigma_i - \sigma_i°}{\sigma_p} \right| \quad (7)$$

$$\beta = \nu_i - \nu_N \quad (8)$$

The results of the arithmetic operations by the operational circuit 23 are indicated by a display 24 and a printer 25.

Figure 3:
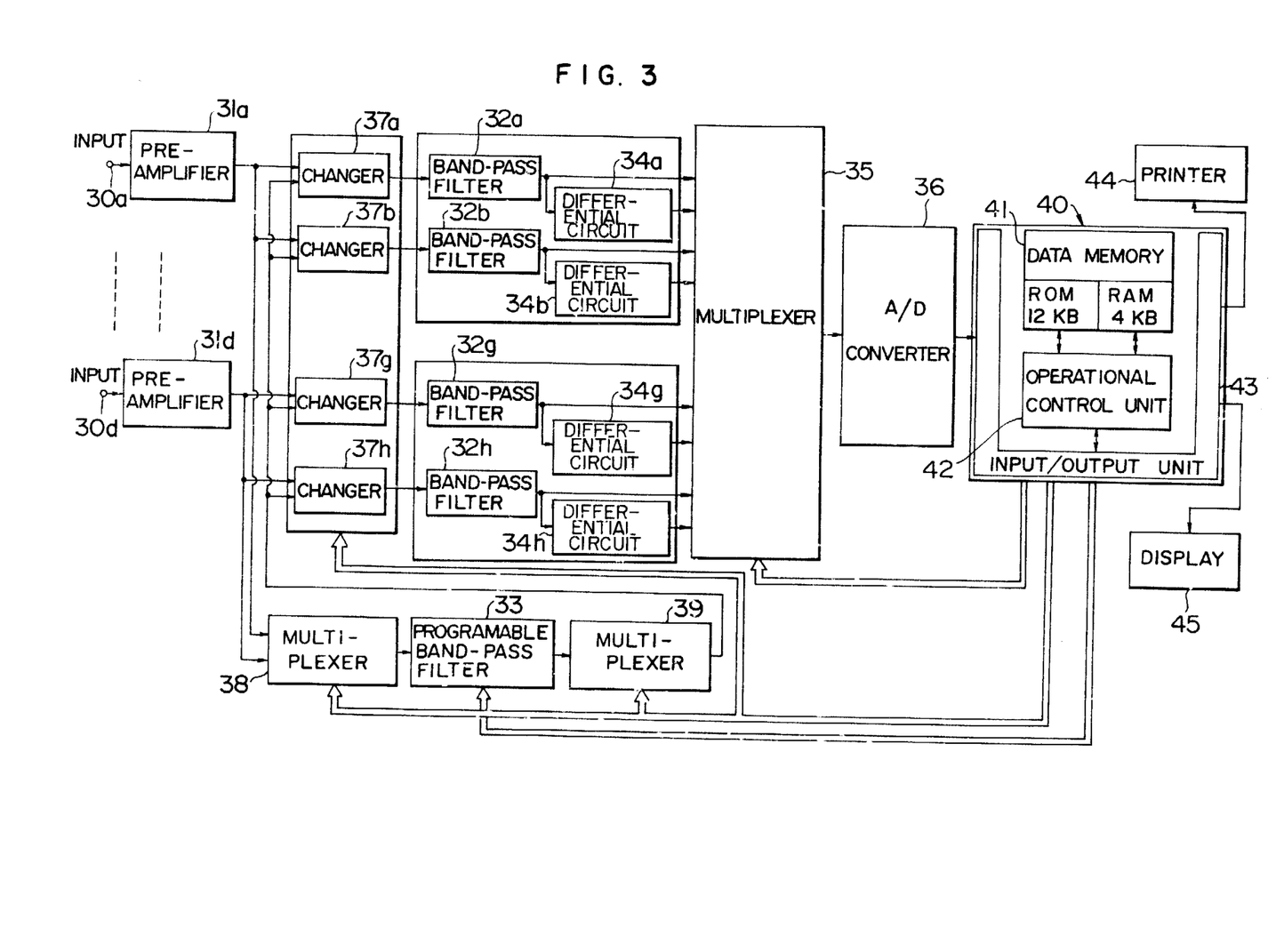
FIG. 3 schematically shows a frequency spectrum variation monitoring system as another embodiment of this invention, in which a part of the system is constructed by a microcomputer.

FIG. 3 shows a frequency spectrum variation monitoring system as another embodiment of this invention, in which a part of the system is constructed by a microcomputer. In the system of FIG. 3, a microcomputer 40 is used instead of the operational circuits 17, 18, 21 and 23, comparator 20, memory 19 and selector 22 in the system shown in FIG. 1.

The system of FIG. 3 can simultaneously process four kinds of noise signals applied to terminals 30a to 30d. Each noise signal is divided into a low frequency range (0.1 Hz-1.0 Hz) and a high frequency range (1.0 Hz-25 Hz) by the associated one of band-pass filters 32a to 32d so that the noise signal in the monitoring frequency range is extracted. The output signals from the band-pass filters 32a to 32d are also supplied differential circuits 34a to 34d so that the differentiated versions of the noise signals are extracted. The RMS values and average frequencies of these noise signals are calculated by sampling the respective signals by the microcomputer 40. The sampling of the noise signals is performed in response to an address control signal delivered from the microcomputer 40 to a multiplexer 35. If an anomalous peak occurs in either one of the input signals, the microcomputer 40 delivers the address control signal associated with the input signal in which the anomalous peak occurs. As a result, the associated one of changers 37a to 37d is switched over to cause the output of a programmable band-pass filter 33 to be applied to the associated one of the band-pass filters 32a to 32d. The address control signal from the microcomputer 40 sets the addresses of multiplexers 38 and 39 before and after the programmable band-pass filter 33 and then sets the cut-off frequencies for the boundary frequencies for the frequency subranges of the programmable band-pass filter 33.

Programs incorporated in the microcomputer 40 are roughly classified in function into four kinds, i.e. an input data processing program, an arithmetic processig program, data pooling program and an output data processing program. The input data processing program has a function of sampling the output data of and A/D converter 36 channel-by-channel in synchronism with the address control operation of the multiplexer 35 to store the sampled data in the predetermined input data area in a data memory 41 and a function of controlling the programmable band-pass filter 33 upon detection of an anomalous peak to establish the frequency subrange. The arithmetic processing program has a function of calculating the RMS values and average frequencies of the noise signals from the sampled data stored in the input data area of the data memory 41 and a function of always monitoring the variations in those RMS values and average frequencies and recognizing them as anomalies when the variations exceed threshold values, to perform calculations according to the above-described equations (2) and (3). The output data processing program causes the calculated results by an operational control unit 42 to be delivered to peripheral units in predetermined formats. The printer 44, the display 45 and an annunicator (not shown) may be used as such peripheral units.

The data pool is used as the working area for the input data processing program, the arithmetic processing program and the output data processing program. The input data processing program, the arithmetic processing program and the output data processing program are stored in a ROM (Read Only Memory) since they are invariable data groups such as programs, whereas a RAM (Random Access Memory) is used for the data pool since it is variable data groups such as the working area which are to be up-dated with time.

Figure 4:
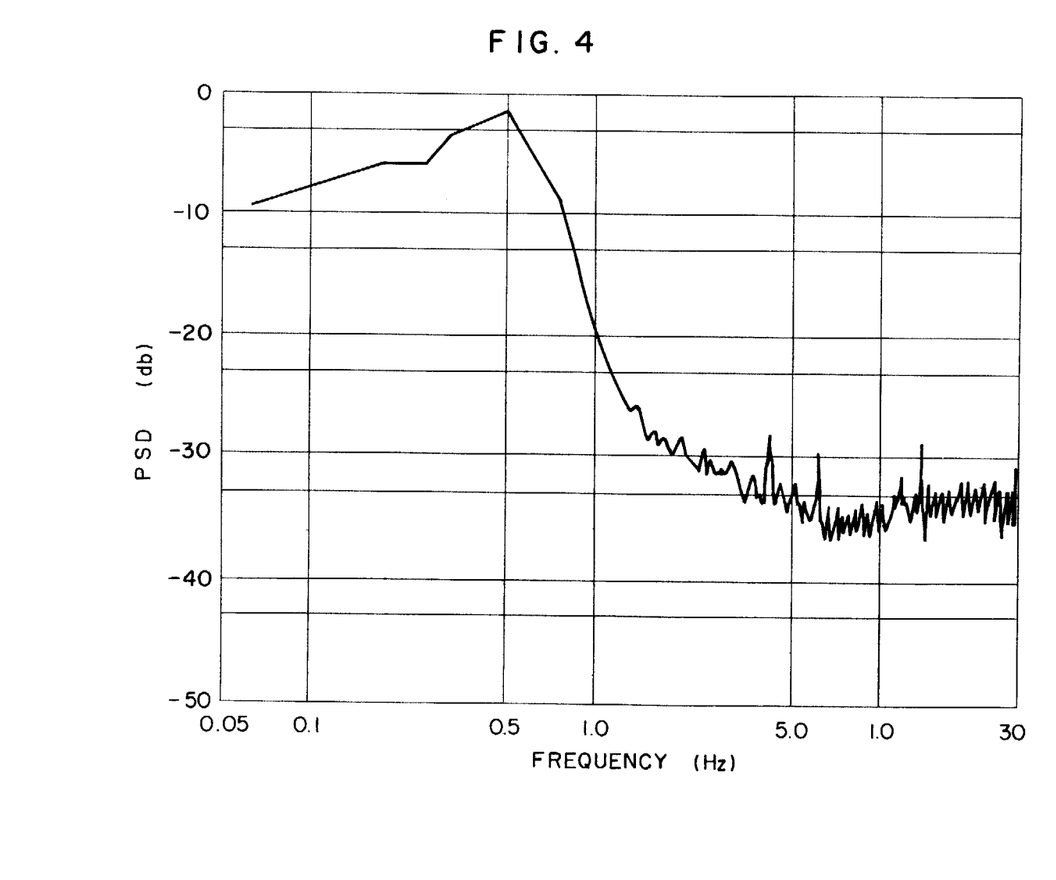
FIGS. 4 to 6 are graphs useful in explaining the effects obtained by the frequency spectrum variation monitoring system according to this invention.
Figure 6:
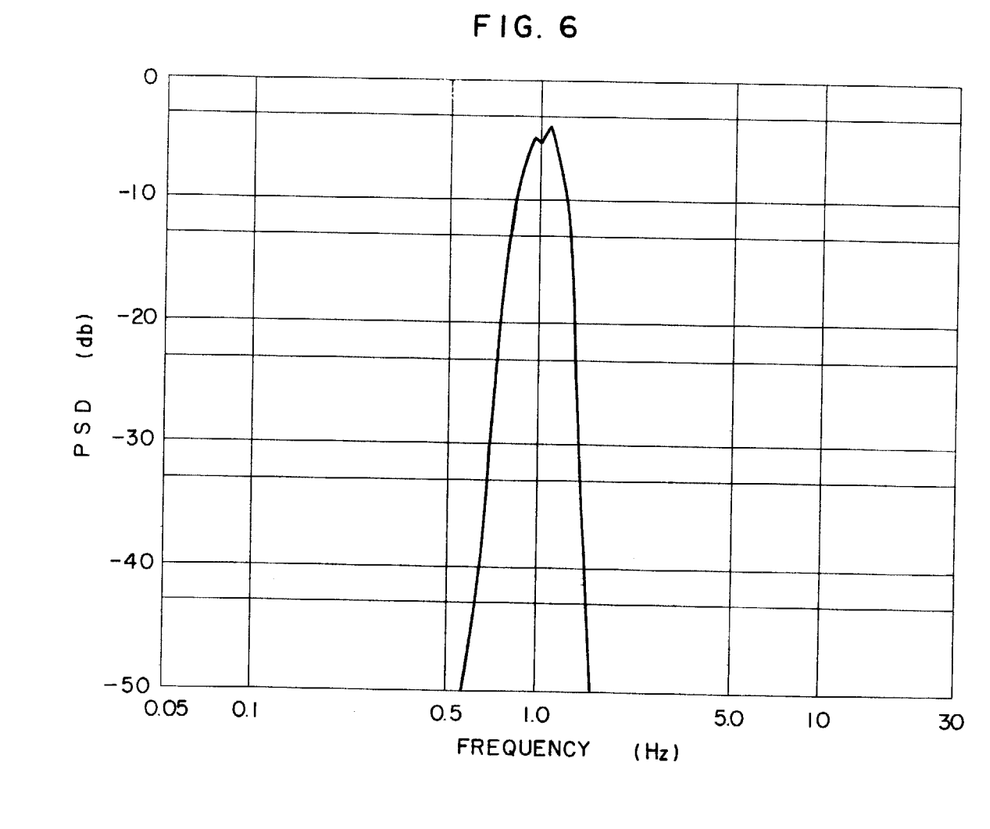

The effects obtained by this invention will not be described with the aid of FIGS. 4 to 6.

FIG. 4 graphically shows the PSD derived from the output signal of a neutron detector recorded during the rated performance of a BWR (Boiling Water Reactor) with an electrical output of 460 MW. FIG. 5 graphically shows the PSD in th case where an anomalous peak is created on the PSD ($S_N$) at the normal state by superposing a simulated anomalous signal upon the recorded output signal of the neutron detector. The experimental results of the RMS values and average frequencies of the signals corresponding to the normal-state PSD ($S_N$) and the anomalous-state PSD ($S_A$) are shown in the following table I.

TABLE I

|  | Normal-State Signal | Simulated Anomalous Signal |
|---|---|---|
| RMS Value (W/cm$^2$) | $\sigma_N$ 1.04 | $\sigma_A$ 1.52 |
| Average Frequency (Hz) | $\nu_N$ 0.515 | $\nu_A$ 0.825 |

When the numerical values in the table I are substituted in the above-described equation (3), the average frequency $\nu_p$ with respect to the variation $S_p$ in the PSD of the output signal of the neutron detector is calculated to be 1.01 Hz. On the other hand, the PSD of the simulated anomalous signal is as shown in FIG. 6 wherein the peak appears at 1 Hz. This value nearly coincides with the average frequency $\nu_2$ obtained by the system according to this invention.

As described above, according to the system of this invention, the variation in frequency spectrum of a singal can be detected by a simple arithmetic circuit arrangement, the frequency of a peak location on the PSD can be detected, and the geometrical variation of the frequency spectrum can also be recognized.

We claim:

1. A frequency spectrum variation monitoring system comprising:
    first means for producing a first analog signal in a specific frequency range in response to receipt of a plant input signal having a given frequency range;
    second means for receivng said first analog signal to deliver a second analog signal which is the time-differentiated version of said first analog signal;
    third means for converting said first and second analog signals into first and second digital signals respectively;
    fourth means for calculating the root mean square value and average frequency of said first analog signal on the basis of said first and second digital signals;
    fifth means for storing the calculated results of said fourth means;
    sixth means for calculating the differences between each of the root mean square value and average frequency previously stored in said fifth means and each of the instantaneous root means square value and average frequency calculated by said fourth means so as to calculate the root mean square value and average frequency of an anomalous peak component in said plant input signal on the basis of the output signals produced by said fourth and fifth means when said differences exceed predetermined values; and
    seventh means for indicating the calculated results of siad sixth means.

2. A frequency spectrum variation monitoring system according to claim 1, wherein said fourth means performs calculations defined by the following equations (1) and (2) and said sixth means performs calculations defined by the following equations (3) and (4):

$$\sigma = \left| \frac{1}{T} \int_0^T \{X(t)\}^2 dt \right|^{\frac{1}{2}} \quad (1)$$

$$\nu = \mu/\sigma \quad (2)$$

$$\sigma_P = |\sigma_A^2 - \sigma_N^2|^{\frac{1}{2}} \quad (3)$$

$$\nu_P = \left| \frac{\nu_A^2 \sigma_A^2 - \nu_N^2 \sigma_N^2}{\sigma_A^2 - \sigma_N^2} \right|^{\frac{1}{2}} \quad (4)$$

where X(t) is the noise component of said plant input signal, T is the time over which the defined integration is performed, $\mu$ is the root mean square value of the time-derivative of X(t), $\sigma_N$ and $\nu_N$ are said normal-state root mean square value and average frequency of said first analog signal respectively, and $\sigma_A$ and $\nu_A$ said instantaneous root mean square value and average frequency of said first analog signal respectively.

3. A frequency spectrum variation monitoring system according to claim 1, further comprising:
    eighth means for dividing said specific frequency range into a plurality of continuous frequency subranges and selecting one of said these frequency subranges in which said average frequency of said anomalous peak component in said plant input signal calculated by said sixth means is contained;
    ninth means for receiving from said plant input signal a third analog signal contained in the frequency subrange selected by said eighth means;
    tenth means for receiving said third analog signal to deliver a fourth analog signal which is the time-differentiated version of said third analog signal;
    eleventh means for calculating the root mean square value and average frequency of said third analog signal on basis of third and fourth digital signals obtained through the conversion of said third and fourth analog signals by said third means; and
    twelfth means for calculating a parameter characteristic of the peaking degree on the basis of the normal-state root mean square value of said third analog signal at the normal state previously stored in said fifth means, said normal-state root means square value of said first analog signal, and the instantaneous root mean square value of said third analog signal at the time instant under consideration calculated by said eleventh means, the output of said twelfth means being supplied to said seventh means.

4. A freqeuncy spectrum variation monitoring system according to claim 3, wherein said twelfth means includes means for calculating a parameter characteristic of the frequency shift on the basis of said normal-state average frequency of said first analog signal stored in said fifth means of and the average frequency of said third analog signal calculated by said eleventh means.

5. A frequency spectrum variation monitoring system according to claim 3, wherein the output of said ninth means is connected to the input of said first means and said second means is used as said tenth means.

6. A frequency spectrum variation monitoring system according to claim 5, wherein said fourth, fifth, sixth, eighth, eleventh and twelfth means are constructed by a microcomputer.

7. A frequency spectrum variation monitoring system according to claim 3, wherein said fourth, fifth, sixth, eighth, eleventh and twelfth means are constructed by a microcomputer.

* * * * *